2,781,914

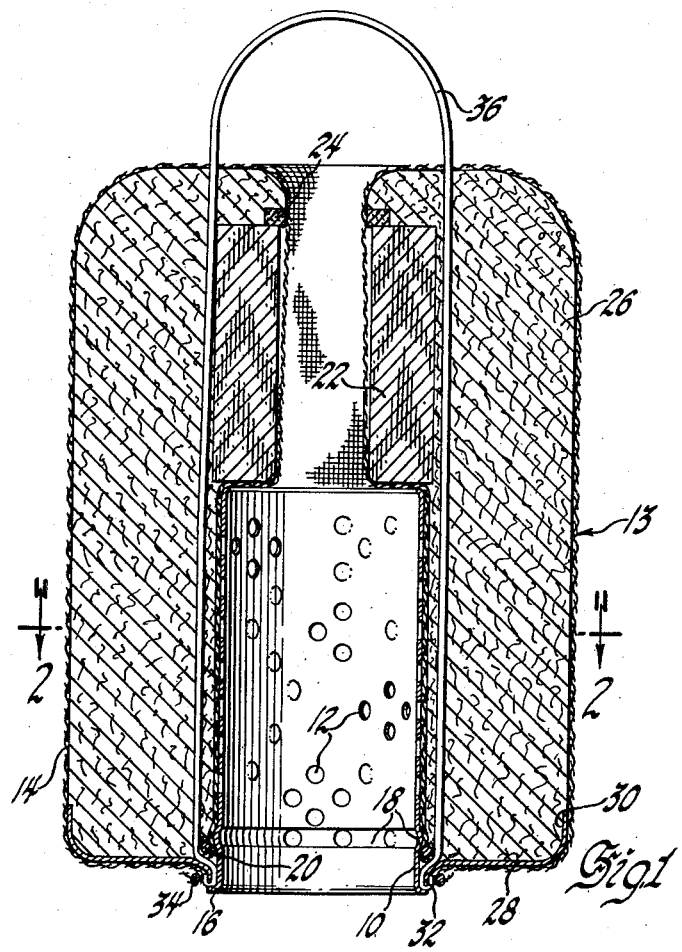
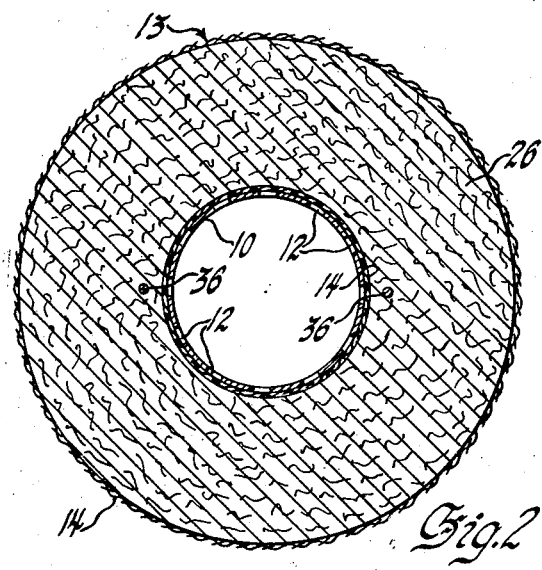
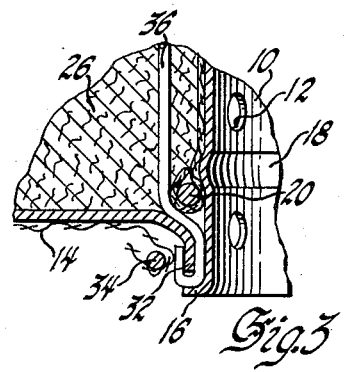
Fig.1
Fig.2
Fig.3
Inventor
James H. DeVoe
Attorney

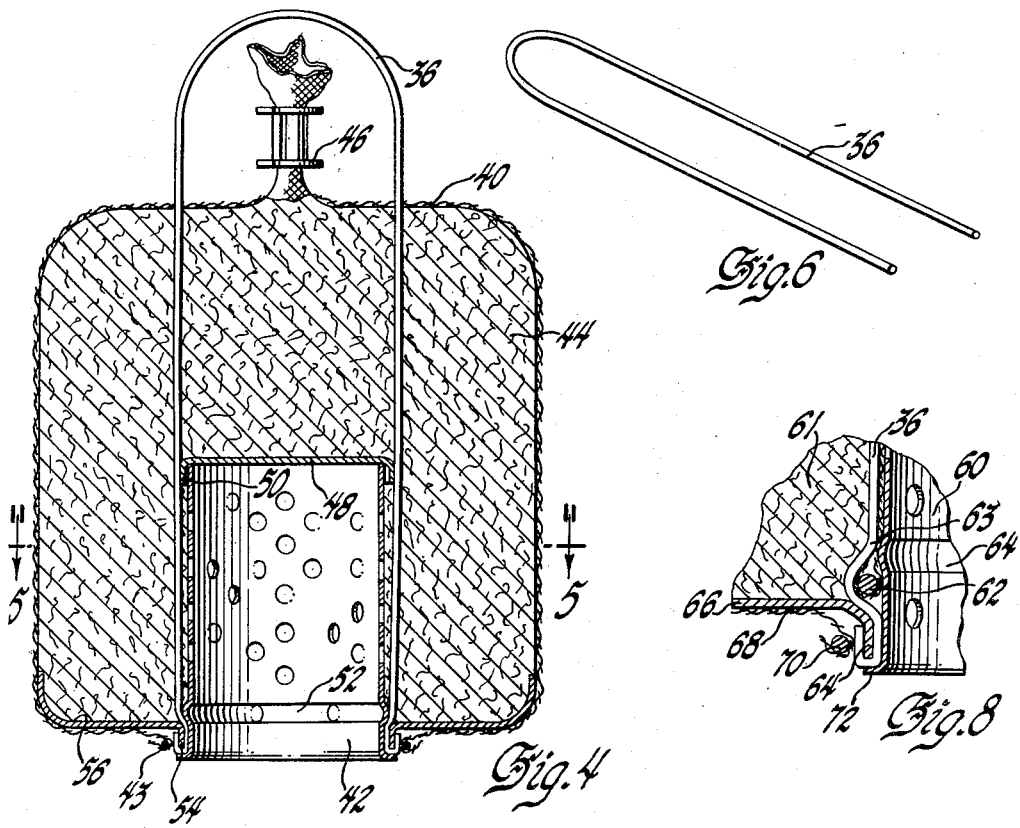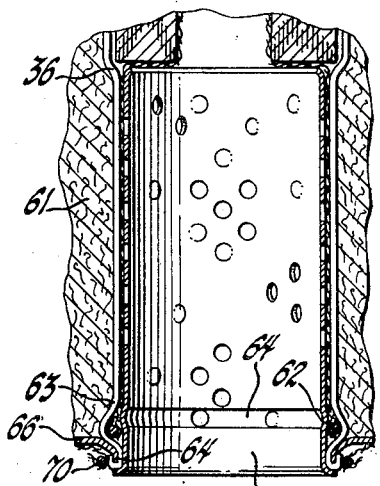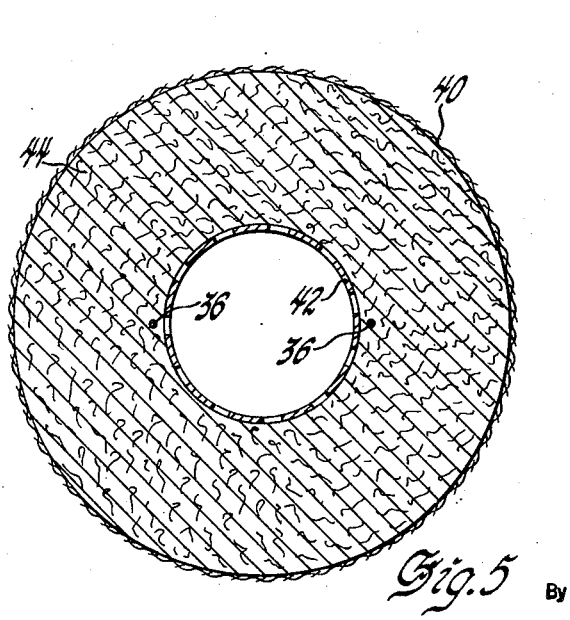

SOCK TYPE FILTERS

James H. De Voe, Flint, Mich., assignor to General Motors Corporation, Detroit, Mich., a corporation of Delaware Application June 1, 1954, Serial No. 433,651

6 Claims. (Cl. 210—148)

This invention relates to fluid filters and more particularly to sock type filters for removing foreign matter from liquids such as lubricating oils with specific regard to means for removing filter elements from casings provided to enclose those elements within a system circulating the liquids.

In modern automobiles it is conventional to use filters to remove solid particles from the engine lubricating oil and such filters utilize a filter element usually enclosed within a casing and arranged in such a way that some, if not all, of the oil must pass through the element before being directed to the engine. After the useful life of the element has expired because of the amount of foreign matter deposited on and in the element, difficulty often arises in removing the plugged up or dirty element as a preliminary to replacing it with a new or clean element. The filter material, being nodulated cotton or of some other suitable fibrous or porous matting or paper material, tends to expand laterally as it is used and often wedges itself tightly within the casing. Various means have been employed in the past for securing a firm grip on the element to enable extraction of the latter from the casing without rupturing it or digging it out. Bails have been used but they have been such that, particularly in the case of sock type filters using knitted or woven coverings, their incorporation in the filter element structure during manufacture has been costly and has necessitated unnecessary effort.

One object of the present invention is to provide an improved sock type filter element which may easily be removed from its casing as a unit after use.

Another object is to provide a sock type element with a bail which is firmly attached to the element, is inexpensive to place into the assembly and is efficient in the performance of its intended function.

In the drawings:

Fig. 1 is a vertical section taken through one form of filter element embodying the present invention;

Fig. 2 is a sectional view taken along the line 2—2 of Fig. 1;

Fig. 3 is an enlarged sectional view of a portion of the structure shown in Fig. 1;

Fig. 4 is a vertical section taken through another form of filter element embodying the present invention;

Fig. 5 is a sectional view taken along the line 5—5 of Fig. 4;

Fig. 6 is a perspective view of a bail before being incorporated in the assemblies shown in the other figures;

Fig. 7 is a sectional view of a portion of a sock type filter constituting a further modification of the structure shown in Fig. 1; and Fig. 8 is a partial and enlarged view of the structure shown in Fig. 7.

In Figs. 1, 2 and 3 a tubular member 10 of stiff paper or metal and having its cylindrical wall perforated as at 12 is enclosed within one end of a tubular filter element 13. The member 10 is relatively rigid and conveniently may be made of paper or of metal. It is also provided with an outwardly extending end flange 16 formed in the last stages of manufacture of the assembled unit and an annular outwardly extending ridge 18. The ridge 18 is spaced from the flange 16 a short distance for a reason which will subsequently appear. The filter 13 is enclosed by a sock 14 formed of knitted cotton or other suitable material, one end of which being tied by means of a string 20 to the tubular member 10 at the side of the ridge 18 nearest to the flange 16. The sock material 14 extends up along the length of the wall of the tubular member 10 and thence along the inner cylindrical wall of a tubular wooden block 22 seated on the upper end of said tubular member 10. The sock material then extends through a resilient neoprene washer 24 seated at the upper end of block 22. Washer 24 has an internal diameter slightly less than that of the bore through the block 22. The sock material then extends outwardly and radially around the filter element and then back to form a closure concentric with the member 10 and block 22. The filter material 26 enclosed by the sock 14 consists of nodulated cotton or an equivalent filtering material. When the enclosure is filled, an annular base plate 28 having an outer flange 30 and an inner oppositely directed flange 32 is placed in position upon the cotton 26 as shown in Fig. 1 and the sock material 14 is then drawn over the plate 28 and fastened around the flange 32 by means of a string 34.

A wire bail 36 is joined to the assembly by pushing the ends thereof through the entire element and wedging them between the tubular member 10 and the flange 32 on the plate 28 as shown in Figs. 1 and 3. Flange 16 may be formed on the member 10 after the lower ends of the bail 36 are bent around flange 32. Flange 16 may be formed by a rotary machine tool to flare the flange out over the bail ends to cause the latter to be hooked over the edge of the flange 32. The ends of the bail 36 may be further extended so that they may be bent around the member 10 and twisted together to give added strength if it is so desired.

When the bail is properly affixed, the exterior end of the sock material may be attached in place by means of the string 34. It is understood, however, that the string 34 may be tied in place before or after the flange 16 is formed and the bail bent in place. In this construction the string 20 and ridge 18 cooperate in bending and gripping the bail ends as is clearly seen in Fig. 3.

In packing the sock 14 with the cotton 26, the curved portion of the bail 36 may be bent out of the way or at right angles with its straight portions so that the packing may take place in a hollow sleeve fixture permitting pressure to be placed on the cotton before the base plate 28 is placed in position. The sleeve fixture will largely determine the size and proportions of the finished unit.

In the case of the filter element of Figs. 1, 2 and 3, the element may be placed in a casing such as shown in the patent to H. G. Kamrath, 2,079,910, which is mentioned merely by way of example, and the washer 24 may form a seal with a central tube through which the oil may be withdrawn.

After use, and when the element has expanded, the bail 36 constitutes a convenient means for extracting the element from the casing and its arrangement is such that a pull on the bail dislodges the element evenly all around its circumference.

The modification shown in Figs. 4 and 5 varies from that of Fig. 1 in that the sock 40, while fastened around a tubular member 42 by means of a string 43, is not drawn inwardly through the filter material 44, but is gathered together at one end by means of a clip 46. In this case, one end of the tubular member 42 is provided with an end plate or cover 48 to support the cotton 44. This plate may or may not be attached to the tubular member 42 as desired and preferably it is flanged as at 50 to fit around the inner end of the member 42. The wire bail 36 is used as in Fig. 1, but in this case it contacts opposite sides of the flanged cover 48 and is spaced from the perforated wall of the member 42. The ends of the bail are clamped between the annular ridge 52 and an inner flange 54 of the base plate 56.

The filter element of Fig. 4 may be installed in a casing as shown in patent to B. Von Pentz, 2,093,877, or in any other similar type of casing and may easily be removed therefrom by means of the strongly attached bail 36.

In Figs. 7 and 8 the bail 36 is so formed as closely to conform with the sides of the tubular member 60, only the sock material being interposed. This type of construction may be preferred over that of Fig. 1 as the wire bail 36 need not penetrate all the cotton 61 and may be pressed toward the member 60 during the packing of the filter material in assembly. This construction has another advantage in that it causes an extra bend at 63 to take place in each end of the bail as it traverses the end of the sock material where the latter is fastened by the string 62. An annular ridge 64 similar to the ridges shown in Figs. 1 and 4, aids to confine the string 62 and the ends of the bail 36 in tight engagement with a flange 64 on the base plate 66. As shown in the drawings, the sock material 68 is tied by a string 70 around the flange 64 and the reversely turned ends of the bail. The tubular member 60 is preferably flanged at 72 by a rotary tool as a final step and this same step may be used to double the bail ends back and around the edges of the flange 64. The string 70 may be outside of or within the ends of the bail.

From the foregoing description it is apparent that the bail ends are effectively held in position and the manufacturing steps for incorporating the bail are few and easily accomplished.

I claim:

1. A filter element for fluids comprising a porous mass of filtering material, a tubular member of relatively rigid material having a perforated wall surrounded by said mass, said member having one end open to the exterior of said mass, a base supporting plate surrounding said one end of said mass, a sock enclosing said mass and base plate, and a bail extending through said mass having two portions extending along opposite sides of said tubular member and clinched into position between the latter and said base plate.

2. A filter element for fluids comprising a porous mass of filtering material, a tubular member of relatively rigid material having a perforated wall surrounded by said mass, said member having one end open to the exterior of said mass, a bored cylinder coaxially arranged with respect to said tubular member, a base supporting plate surrounding said one end of said mass, a sock enclosing said mass, bored cylinder and base plate, and a bail having two portions extending along opposite sides of said bored cylindrical member and said tubular member and clinched into position between the latter and said base plate.

3. A filter element for fluids comprising a porous and cylindrical mass of filtering material, a tubular member of relatively rigid material having a perforated wall surrounded by said mass, said member having one end open to the exterior of said mass, a base supporting plate engaging one end of said mass, a sock enclosing said mass and base plate, and a bail having two portions extending through both ends of said mass and along opposite sides of said tubular member and clinched into position between the latter and said base plate.

4. A filter element for fluids comprising a porous mass of filtering material, a tubular member of relatively rigid material having a perforated wall surrounded by said mass, said member having one end in communication with the exterior of said mass, an outwardly extending ridge on said tubular member, a base plate for said mass, a flange on said base plate, and a bail having two portions extending through said filtering material with the end of each portion clinched into position between the said ridge and base plate and also between the tubular member and said flange.

5. A filter element for fluids comprising a porous mass of filtering material, a tubular member of relatively rigid material having a perforated wall surrounded by said mass, said member having one end open to the exterior of said mass and bearing an annular outwardly extending ridge, a base plate surrounding said one end and adapted to support said mass, said base plate having inner and outer flanges extending in opposite directions, a sock enclosing said mass and base plate, and a bail having two portions extending through the ends of said filtering material and along opposite sides of said tubular member with the end of each bail portion being clinched around the edge of said inner flange.

6. A filter element for fluids comprising a porous mass of filtering material, a perforated tubular member within said mass having an annular ridge and an end flange, a base plate surrounding said member and having a flange disposed adjacent said ridge and said first-mentioned flange, a sock enclosing said mass and base plate with one end joined to said member between the base plate flange and the said ridge, the other end of said sock being fastened adjacent said last-mentioned flange, and a bail extending through both ends of said mass and having each of its ends held between said sock and the base plate flange and also between the latter and the said first-mentioned flange.

References Cited in the file of this patent
UNITED STATES PATENTS

| | | |
|---|---|---|
| 2,201,418 | Williams et al. | May 21, 1940 |
| 2,301,121 | Kamrath | Nov. 3, 1942 |
| 2,331,856 | Pearson | Oct. 12, 1943 |
| 2,367,745 | Wicks | Jan. 23, 1945 |
| 2,375,345 | Burhans | May 8, 1945 |
| 2,543,481 | Wicks et al. | Feb. 27, 1951 |
| 2,550,070 | LaBrecque et al. | Apr. 24, 1951 |
| 2,613,814 | Moore | Oct. 14, 1952 |
| 2,675,919 | White | Apr. 20, 1954 |